INVENTOR.
JOHN R. ZURBRICK

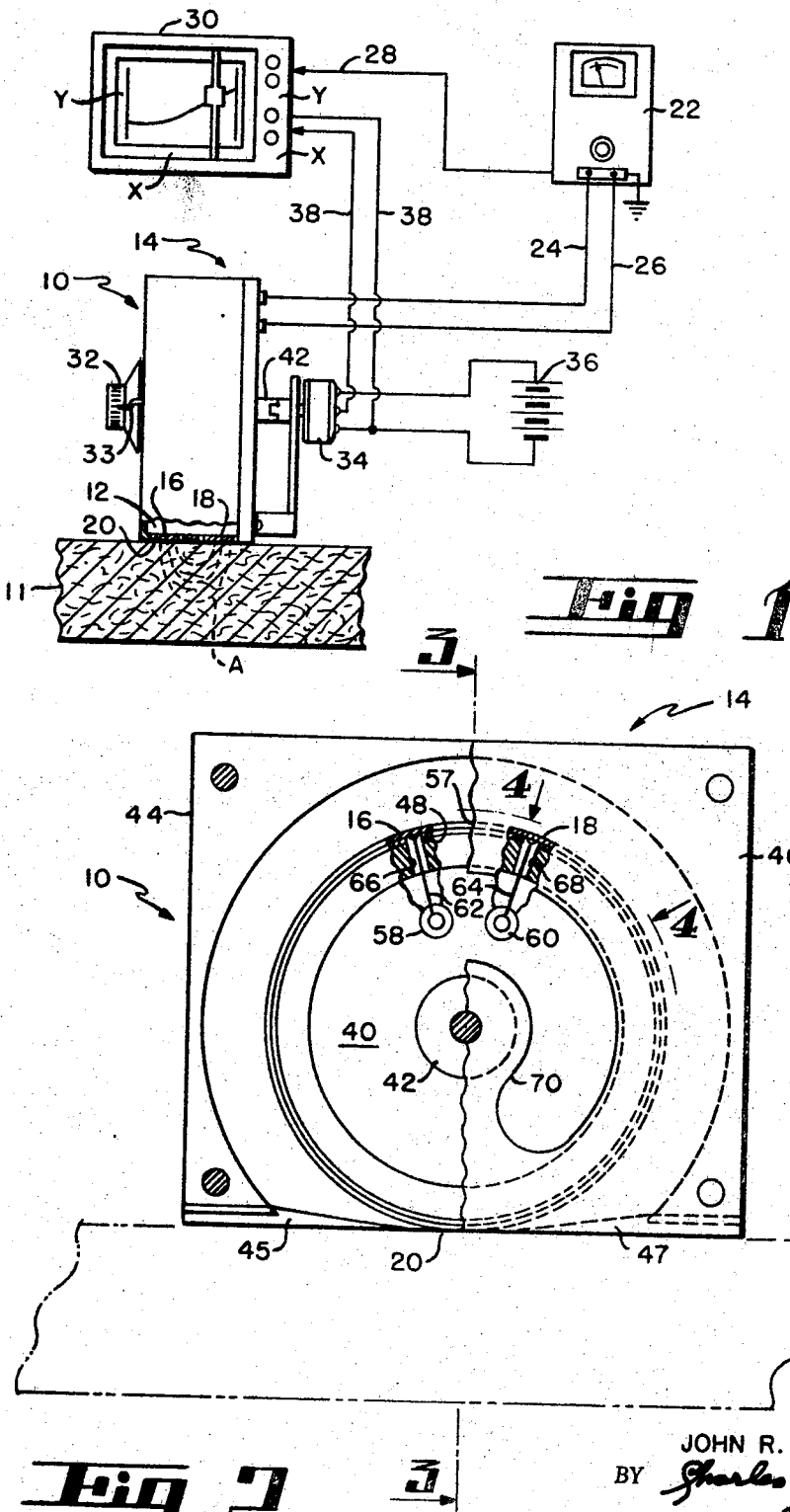

United States Patent Office 3,493,854
Patented Feb. 3, 1970

3,493,854
DIELECTRIC PROBE HAVING A VARIABLE
EFFECTIVE DEPTH OF FIELD
John R. Zurbrick, Nashua, N.H., assignor to Avco Corporation, Wilmington, Mass., a corporation of Delaware
Filed Dec. 13, 1967, Ser. No. 690,263
Int. Cl. G01r 27/26; H01g 7/00
U.S. Cl. 324—61                     6 Claims

ABSTRACT OF THE DISCLOSURE

The disclosure illustrates a dielectric probe for determining the material property gradients in a specimen, e.g., moisture gradient in insulating materials. A pair of generally coplanar elongated capacitance elements are formed around a relatively stable dielectric material concentric with a disc at ground potential. A thin strip at ground potential is positioned between the plate elements. The disc is journaled in a housing also at ground potential and having an opening which exposes a portion of the elongated elements. A suitable capacitance indicating instrument is connected to the plate elements so that an electrostatic fringe field extends between the elements. The plate elements are shaped so that a given rotation of the disc in the housing produces a given variation in the effective depth of field of the electrostatic fringe field.

---

The present invention relates to dielectric probes and more specifically to dielectric probes for use in testing materials.

It is common practice to utilize dielectric probes for determining material properties such as the moisture content of insulating material. These devices are used by generating an electrostatic field between a pair of dielectric plate elements which passes through the insulating material. The material properties are then ascertained by measuring the capacitance across the plate elements. Until recently dielectric probes of the coplanar type which generate an electrostatic fringe field have been limited by an inability to detect relatively small differences in material properties. A coplanar dielectric probe, as illustrated in the copending application entitled "Dielectric Probe," in the name of John R. Zurbrick and Robert S. Menchel, Ser. No. 676,843, filed Oct. 20, 1967 and assigned to the same assignee as the present invention, is a significant step in the direction of obtaining high sensitivity. Relatively small differences in material properties are detectable by making unvariable all of the electrostatic fields generated from the coplanar plate elements except those passing through the material specimen to be tested.

However, in the testing of insulating materials to determine their moisture content, it is extremely desirable to be able to evaluate the variation in moisture content across the various thicknesses of the insulation. This is difficult to obtain with the present coplanar probe because of the fact that their effective depth of field is fixed and the capacitance measurement is an average determination of moisture content.

Accordingly, it is an object of the present invention to provide a highly effective and accurate dielectric probe for determining material property gradients.

The above ends are achieved by providing a dielectric probe comprising first and second generally coplanar elongated conductive plate elements separated from one another. One of the elements receives an electrical signal and the other produces signal in response to the electrostatic fields extending from the surface of the plate elements. The plate elements have a predetermined area relationship and gap between the inner edges thereof for providing a fringe field having an increasing effective depth of field as a function of the distance from one end of the plate elements. A conductive ground potential surface is provided between the first and second plate elements. A conductive plane at ground potential is closely spaced from one side of the plate elements, the conductive plane extending at least as far as the outer edges of the elements. The dielectric constant in the space between the plate elements and the ground potential plane is maintained substantially constant. A surface at ground potential surrounds the plate elements on the opposite side thereof and has an opening in line with a portion of the length of the plate elements whereby the fringe field extending from the plate elements is limited in area by the opening. The plate elements are displaceable past the opening whereby an electrostatic fringe field having a variable effective depth extends from the opening for interaction with a material specimen placed over the opening.

The above and other related objects and features of the present invention will be apparent from a reading of the description of the disclosure found in the accompanying drawings and the novelty thereof pointed out in the appended claims.

In the drawings:

FIGURE 1 is a highly simplified end view of a dielectric probe embodying the present invention together with associated indicating instruments with which it may be used.

FIGURE 2 is a detailed side view, partially broken away, of the dielectric probe shown in FIGURE 1.

Figure 3:
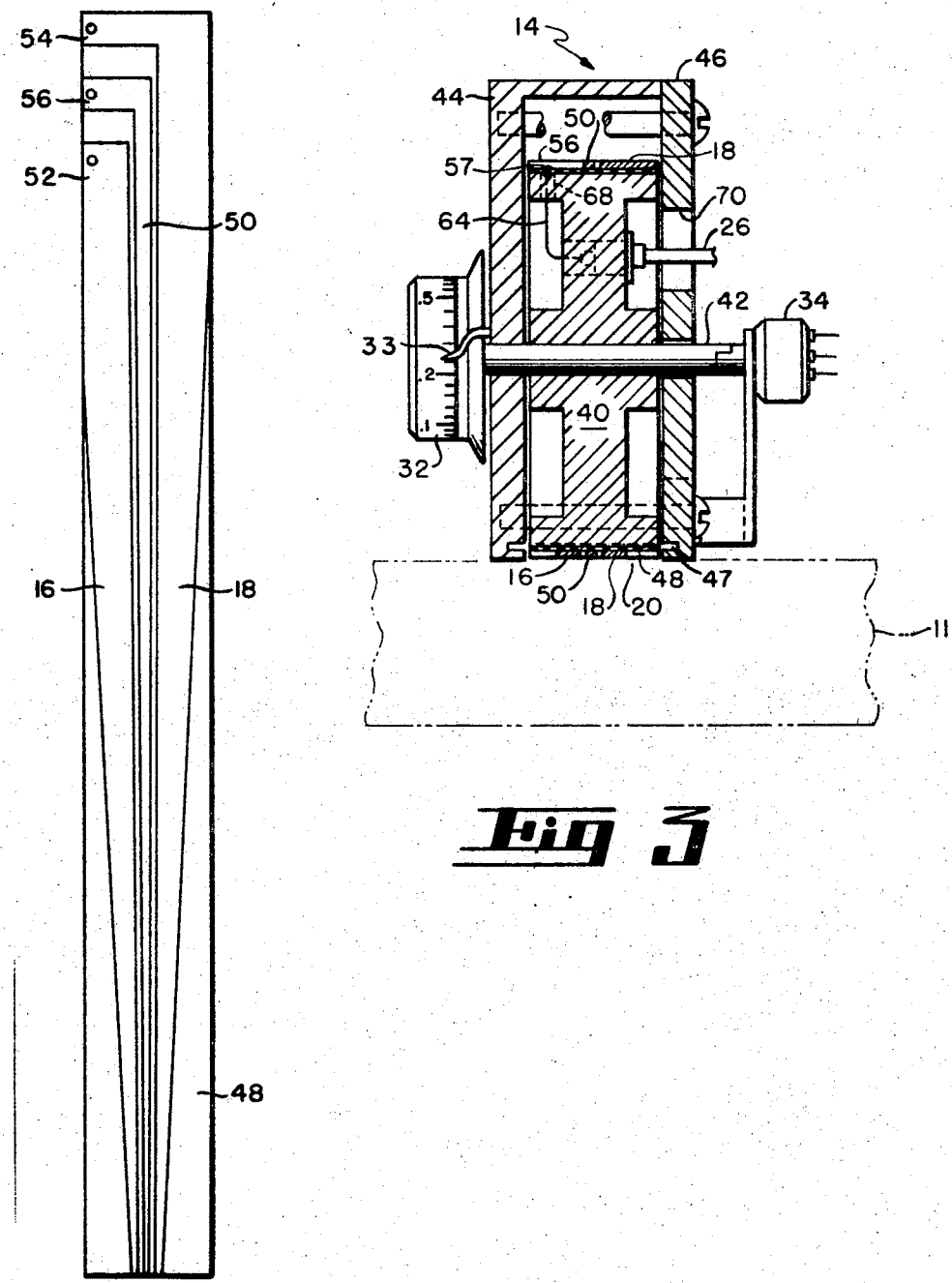
FIGURE 3 is a view taken on lines 3—3 of FIGURE 2.

Reference is particularly had to FIGURE 1 which illustrates the dielectric probe 10 as used to test a material specimen 11, such as insulation. As shown diagrammatically, the probe 10 comprises a disc 12 journaled in a housing 14 and having a pair of generally coplanar elongated plate elements 16, 18. An opening 20 in the housing 14 exposes a portion of the plate elements 16, 18 to the specimen 11. The plate elements 16 and 18 are respectively electrically connected to a direct-reading capacitance meter 22 by a pair of shielded cables 24, 26. Briefly, the capacitance meter generates an electrical signal at one plate element and measures the electrical signal induced on the other by the electrostatic field between the two elements. Since the elements 16, 18 are coplanar with each other, and electrostatic fringe field extends out of the surface in which the elements are positioned and between one another as indicated by lines A. The electrostatic fringe field interacts with the material specimen 11 to give an indication of the specimen properties, e.g., moisture content. The direct-reading capacitance meter may be a suitable instrument for this purpose, such as the Ballantine direct-reading capacitance meter, Model 520, manufactured by Ballantine Laboratories, Inc., P.O. Box 97, Boonton, N.J. 07005. Preferably, the direct-reading capacitance instrument 22, in addition to providing a visual indication of the capacitance of the material 11, should generate an electrical output signal, such as a voltage signal, which is fed via cable 28 to the $y$ axis input of an $x$–$y$ recorder 30. As later described in detail, the probe 10 generates an electrostatic fringe field between the plate elements having a variable effective depth of field functionally related to the angular displacement of the disc 12. The disc 12 is angularly displaced by a calibrated operator-manipulated knob 32. A potentiometer 34 has a wiper arm (not shown) connected to the disc 12. The potentiometer is connected to a D.C. voltage source 36 in such a manner that it serves to variably divide the voltage of the voltage source 36 as a function of the angular displacement of the disc 12 to which the wiper arm of the potentiometer 34 is attached. This variably divided voltage is connected via cables 38 to the x input of the x–y recorder 30.

In operation the electrostatic field A extends through the specimen 11 and the interaction of the specimen and the electrostatic field is reflected in the capacitance measured by the instrument 22. It should be noted that the capacitance value indicated is a value reflecting the average capacitance of the material properties up to the effective depth of the electrostatic field. In order to obtain a measurement of material property gradients the disc 12 is rotated so that the effective depth of field and, accordingly, the thickness over which the average capacitance value is obtained, is varied. Thus, as the disc is rotated by manipulation of knob 32, the potentiometer 34 divides the voltage from the source 36 to produce an x axis input for the recorder 30. At the same time the capacitance meter 22 generates a y axis input reflecting the average capacitance value of the material for the particular effective depth of field. As a result, a plot of average capacitance value versus depth of field is generated which may be used not only to graphically obtain the average across the thickness of the material but to ascertain material property differences at varying depths.

Figure 4:
FIGURE 4 is a view taken on lines 4—4 of FIGURE 2 in the direction of the arrows.

Reference is now had to FIGURES 2, 3 and 4 which show the dielectric probe 10 in greater detail. The disc 12 comprises an inner electrically conductive wheel 40, such as aluminum, secured to a shaft 42 which is journaled in side walls 44 and 46 of the housing 14, which is also electrically conductive. The end of shaft 42 which extends through the side wall 44 has secured thereto the calibrated knob 32 previously referred to. The end of the shaft 42 which extends through the side wall 46 is connected to the wiper arm of the potentiometer 34. A pair of wedge plates 45, 47 extend between the side walls 44 and 46 to form the opening 20 and provide a plane against which the specimen 11 is placed. The aluminum wheel 40 has a relatively thin concentric band of dielectric material 48 around its periphery. Around the periphery of the dielectric band 48 is formed the plate elements 16 and 18 and an intermediate strip 50. As later explained, it is extremely important that the wheel 40 and plate elements be concentric. For this end a special fabricated technique described below may be employed.

The aluminum wheel 40 is initially formed to a thickness and diameter greater than the desired thickness. An annular groove is formed from one side of the wheel to a distance equal to the desired thickness of the wheel. The depth of the groove is such that the diameter of the wheel at the grooved portion is equal to the desired diameter. An outer sleeve is machined to be press fit over the maximum diameter portion of the wheel 40. A curable dielectric material capable of bonding the sleeve and wheel, such as epoxy resin, is applied to the groove, the sleeve press fit over the wheel and the assembly allowed to cure. After the assembly has cured, the plate elements 16, 18 and intermediate strip are formed by the removal, as by grinding of selected portions of the sleeve. A central hole concentric with the outer surface of the plates is then bored to accept the shaft 42. The excess axial thickness of the wheel, sleeve and dielectric material is then machined away so that the machined sleeve and wheel are electrically separated by the dielectric band 48.

As shown particularly in FIGURE 4, the plate elements 16 and 18 are elongated and have a diverging gap between their inner edges. The outer edges of the plate elements 16 and 18 diverge from the left to a maximum width. The thin intermediate strip 50 lies in the gap between the plate elements 16 and 18 and is electrically insulated therefrom. The plate elements 16, 18 and the intermediate strip 50 have end portions 52, 54 and 56 which extend to the side wall of the wheel 40. The intermediate strip 50 is electrically connected to the aluminum center wheel 40 by a wire 57. The plate elements 16 and 18 are respectively electrically connected to a central terminal of coaxial output connectors 58 and 60 by wires 62 and 64 which extend, respectively, through passageways 66 and 68. The wires 62 and 64 are suitably insulated from the aluminum wheel 40 and housing side walls 44, 46 by suitable means (not shown). The outer portion of the coaxial connectors 58 and 60 is electrically connected to the aluminum wheel 40. Clearance for the output connectors 58 and 60 is provided by a generally horseshoe-shaped opening 70 in the side wall 46 of the housing 14. As described previously, these output connectors 58 and 60 connect with the cables 24, 26 so that the housing 14, the wheel 40 and the intermediate strip 50 are all maintained at ground potential.

Thus, disturbances caused by stray capacitance are minimized, if not eliminated. The thin intermediate strip 50 prevents a parallel plate effect between the plate elements 16 and 18 owing to their thickness and causes the electrostatic field to be generated out of the plane of the plate elements 16 and 18. The aluminum wheel 40 at ground potential and the relatively stable dielectric band 48 prevent the generation of an electrostatic fringe field on the side of the plate elements 16 and 18 opposite that which is adjacent the material specimen 11. The housing 14 surrounds the plate elements and the opening 20 limits in area the projected electrostatic field. Accordingly, the only remaining electrostatic field is that projected through the material specimen 11, thereby causing the plate elements 16, 18 to be highly sensitive to material property variations. Because the plate elements are concentric with the shaft 42, they are maintained at substantially a fixed distance from a material specimen 11 placed over the outer surface of the wedge plates 45, 47. Thus the variation in capacitance indicated across the plate elements due to varying distance from the specimen is minimized, if not eliminated.

The field has been found to have an effective depth which is functionally related to the width of the gap between the plate elements and the area of the plate elements. Thus the effective depth of field for the electrostatic field at a given point along the length of the elongated plate elements may be generally expressed as:

$$D.F. = G + \tfrac{1}{2}(H+L)$$

where:

D.F.=depth-of-field
G=width of gap
H=width of Hi electrode
L=width of Lo electrode Accordingly, for plate elements having a diverging width gap, as shown in FIGURE 4, the plate elements have a width which increases linearly from one end to the other so that the electrostatic field emanating between the two plate elements has an effective depth of field which increases from one end of the plate elements to the other. Since only a portion of the elongated plate elements is exposed to the material specimen, the effective depth of the electrostatic field is determined by the dimensions of the portions of the elements exposed to the opening 20. It is readily apparent that an electrode configuration may be selected to enable calibration of the knob 32 relative to the housing 14 in terms of effective depth of field which is functionally rotated to the angular displacement of the wheel 40 and the probe elements 16 and 18. This is indicated in FIGURE 3 wherein the knob 32 is indexed for depth of field in inches relative to a pointer 33 secured to the housing 14.

The dielectric probe described above is a highly accurate and effective device for measuring the variation in material properties with varying thickness. It will be apparent to those skilled in the art that the probe may be applied to materials other than those described above and may be utilized with indicating instruments other than those specifically described with equal utility. It is also apparent that the geometry of the device may be changed from that specifically shown in the above discussion without departing from the spirit of the invention.

Having thus described the invention what is claimed as novel and desired to be secured by Letters Patent of the United States is:

1. A dielectric probe for determining material property gradients, said probe comprising:
    a grounded housing having an opening and a surface surrounding the opening for contacting a material specimen;
    a grounded conductive disc positioned in said housing;
    means for journaling said conductive disc in said housing so that a portion of the periphery of said disc is in line with and a given distance from said opening;
    a thin circular band of relatively stable dielectric material formed around the outer periphery of said disc;
    first and second elongated conductive plate elements spaced from one another to form a gap and positioned around a portion of the outer periphery of said dielectric material, one of said elements being adapted to receive an electrical signal and the other adapted to produce an electrical signal in response to the electrostatic field projected therebetween and through the opening in said housing;
    said plate elements being positioned relative to one another and having a generally diverging surface configuration so that the effective depth of the electrostatic field between the plate elements increases from the narrow to the wide ends of the plate elements;
    a relatively thin elongated grounded band positioned on said dielectric material in the gap between said plate elements;
    whereby as said conductive disc is rotated an electrostatic field having a variable depth of field is projected from said opening.

2. A dielectric probe as in claim 1, wherein:
    said first and second plate elements have linear opposing edges and are positioned to form a gap of diverging width therebetween.

3. A dielectric probe as in claim 1, wherein:
    said housing has first and second side walls having inner surfaces closely spaced from and parallel to the sides of said disc,
    said means for journaling said disc comprises a shaft secured to said disc and extending through circular openings in said side walls,
    one of said side walls has a generally horseshoe-shaped opening exposing a substantial portion of a side wall of said disc,
    said disc has a pair of passageway means extending from the inner portion of said disc in line with said horseshoe-shaped opening through the dielectric band to the respective first and second plate elements,
    said probe further comprises
        electrical output connector means mounted at the inner end of each passageway means, said electrical connector means having an insulated center connection and a coaxial outer connection, said outer connection being electrically connected to said disc,
    means for electrically connecting said first and second plate elements to said center connection, and
    means for electrically connecting said conductive strip to said disc.

4. A dielectric probe as in claim 3, further comprising:
    indicating means connected to said shaft and rotatable with said shaft relative to said housing, said indicating means having inditia thereon for indicating the angular displacement of said disc and relative to said housing as a proportional function of the depth of said fringe field extending from said opening.

5. Apparatus as in claim 4 in combination with:
    means for generating a first signal proportional to the angular displacement of said disc and plates thereby indicating the depth of said fringe field extending from said opening,
    means connected to said output connectors for generating an output signal reflecting the capacitance of said plate elements,
    an x-y recorder receiving one input from said angular displacement signal generating means and another signal from said capacitance indicating means,
    whereby the output of said recorder reflects the dielectric properties of a material specimen at varying thicknesses.

6. Apparatus as in claim 5 wherein,
    said angular displacement signal generating means comprises:
        means for generating a fixed voltage signal,
        a potentiometer electrically connected to the output of said voltage generating means for variably dividing the voltage output, said potentiometer being mechanically connected to said shaft for dividing the voltage proportional to the angular displacement of said disc from a given value.

References Cited

UNITED STATES PATENTS

| | | | |
|---|---|---|---|
| 2,285,152 | 6/1942 | Firestone | 324—61 |
| 2,428,700 | 10/1947 | Eilenberger | 324—61 |
| 2,718,620 | 9/1955 | Howe | 324—61 |
| 3,376,503 | 4/1968 | Lundstrom | 324—61 |
| 3,400,331 | 9/1968 | Harris | 324—61 |

EDWARD E. KUBASIEWICZ, Primary Examiner

U.S. Cl. X.R.

317—246